US012571422B2

(12) United States Patent
   Greuel

(10) Patent No.: US 12,571,422 B2
(45) Date of Patent: Mar. 10, 2026

(54) DOUBLE BALL AND SOCKET JOINT

(71) Applicant: A & E INCORPORATED, Racine, WI (US)

(72) Inventor: Billy Greuel, Waterford, WI (US)

(73) Assignee: A & E Incorporated, Racine, WI (US)

( * ) Notice: Subject to any disclaimer, the term of this patent is extended or adjusted under 35 U.S.C. 154(b) by 331 days.

(21) Appl. No.: 18/298,099

(22) Filed: Apr. 10, 2023

(65) Prior Publication Data

US 2024/0337285 A1 Oct. 10, 2024

(51) Int. Cl.
   *F16C 11/06* (2006.01)
   *F16C 11/10* (2006.01)

(52) U.S. Cl.
   CPC ........ *F16C 11/0614* (2013.01); *F16C 11/106* (2013.01); *F16C 2226/74* (2013.01); *Y10T 403/32032* (2015.01)

(58) Field of Classification Search
   CPC .......... A45D 42/00; A45D 42/16; A47G 1/16; B25B 9/00; B25B 23/0028; F16B 21/18; F16B 21/183; F16B 21/186; F16C 11/0604; F16C 11/0614; F16C 11/069; F16C 11/106; F16C 2226/74; F16M 11/14; F16M 11/2078; G02B 7/182; G02B 7/1821; G02B 7/1822; G02B 7/1824; Y10T 403/32008; Y10T 403/32032; Y10T 403/32041; Y10T 403/32565; Y10T 403/32573
   USPC ........ 81/177.75; 359/872, 876, 882; 403/53, 403/56, 57, 114, 115
   See application file for complete search history.

(56) References Cited

U.S. PATENT DOCUMENTS

| 270,705 | A | * | 1/1883 | Tumey | F16M 11/14 |
| | | | | | 403/56 |
| 508,006 | A | * | 11/1893 | Filstrup | F21V 21/26 |
| | | | | | 403/56 |
| 569,436 | A | | 10/1896 | Spurr | |
| 757,143 | A | | 4/1904 | Reilly | |
| 1,220,069 | A | | 3/1917 | Capdevila | |

(Continued)

FOREIGN PATENT DOCUMENTS

| CN | 217056404 | 7/2022 |
| EP | 0570793 | 11/1993 |

(Continued)

OTHER PUBLICATIONS

Telescoping Inspection Mirror (Blue Point Black UIM225) Snap on Store: website accessed Apr. 6, 2023; one page.

(Continued)

*Primary Examiner* — Josh Skroupa

(57) ABSTRACT

A double ball and socket joint is formed of a two-piece capsule. Each piece of the capsule carries a ball and extension combination that operates rotationally within a socket. The extensions exit the capsule through void spaces at both distal ends of the capsule. The two pieces of the capsule are preferably in snap-fit engagement. The result is that the double ball and socket joint of the present invention provides infinite combinations of rotation about five axes of rotation: a first and a second axis of rotation about the first ball, a third and a fourth axis of rotation about the second ball, and a fifth axis of rotation is provided when the two pieces of the capsule are rotated relative to one another.

13 Claims, 4 Drawing Sheets

(56)                    References Cited

U.S. PATENT DOCUMENTS

| | | | | |
|---|---|---|---|---|
| 1,637,612 | A * | 8/1927 | Hundemer | F16N 21/04 403/56 |
| 1,772,284 | A * | 8/1930 | Johansson | F16M 11/2078 248/324 |
| 1,827,432 | A | 10/1931 | Hunderner | |
| 1,905,633 | A | 4/1933 | Feltham | |
| 2,100,069 | A * | 11/1937 | Creveling | F16N 21/00 131/225 |
| 2,456,182 | A * | 12/1948 | Goble | F16M 11/2078 403/144 |
| 2,460,880 | A * | 2/1949 | Geizer | F16M 11/14 403/56 |
| 2,799,742 | A | 7/1957 | Schwartz | |
| 2,886,355 | A * | 5/1959 | Wurzel | F16B 21/18 403/326 |
| 3,022,096 | A | 2/1962 | Schwartz | |
| 3,104,067 | A | 9/1963 | Stiffel | |
| 3,158,935 | A | 12/1964 | Rosenthal | |
| 3,300,859 | A | 1/1967 | Sanden | |
| 3,635,435 | A * | 1/1972 | Perison, Sr. | B60R 1/04 403/144 |
| 3,638,243 | A * | 2/1972 | Campbell, Jr. | A61F 2/3804 403/115 |
| 3,986,692 | A | 10/1976 | Konoshita | |
| 4,090,506 | A | 5/1978 | Pilgrim | |
| 4,620,730 | A * | 11/1986 | Larsen | F16L 27/047 285/146.2 |
| 4,856,888 | A | 8/1989 | Wahl | |
| 5,131,785 | A * | 7/1992 | Shimazaki | F16B 21/18 403/326 |

| | | | | |
|---|---|---|---|---|
| 5,409,269 | A | 4/1995 | Karlsson et al. | |
| 5,419,522 | A | 5/1995 | Luecke et al. | |
| 5,428,484 | A | 6/1995 | Baker | |
| D379,656 | S | 6/1997 | Reynolds et al. | |
| D404,632 | S | 1/1999 | Reynolds et al. | |
| 6,069,340 | A | 5/2000 | DeCanio | |
| 6,540,193 | B1 | 4/2003 | DeLine | |
| 6,698,906 | B1 * | 3/2004 | Tally | G02B 5/08 359/876 |
| 7,475,998 | B1 | 1/2009 | Pena | |
| 7,993,069 | B2 | 8/2011 | Persson | |
| 10,583,790 | B2 | 3/2020 | Wang | |
| 10,801,718 | B2 | 10/2020 | Coleman et al. | |
| 10,948,006 | B2 * | 3/2021 | Mojica | F16B 45/023 |
| D949,580 | S | 4/2022 | Acevedo-Duncan | |
| 2008/0284165 | A1 * | 11/2008 | Chiang | F16L 27/04 285/261 |
| 2011/0121564 | A1 | 5/2011 | Kaplan | |

FOREIGN PATENT DOCUMENTS

| | | | | |
|---|---|---|---|---|
| FR | 699369 | A * | 3/1931 | F16L 27/04 |
| FR | 787353 | A * | 9/1935 | F16L 27/04 |
| GB | 1426733 | | 3/1976 | |
| GB | 1426733 | A * | 3/1976 | B60R 1/06 |
| WO | WO2013/100838 | | 7/2013 | |

OTHER PUBLICATIONS

International Search Report and Written Opinion of the ISA mailed Jun. 3, 2024, as cited in corresponding application PCT/US2024/019526; 12 pgs.

* cited by examiner

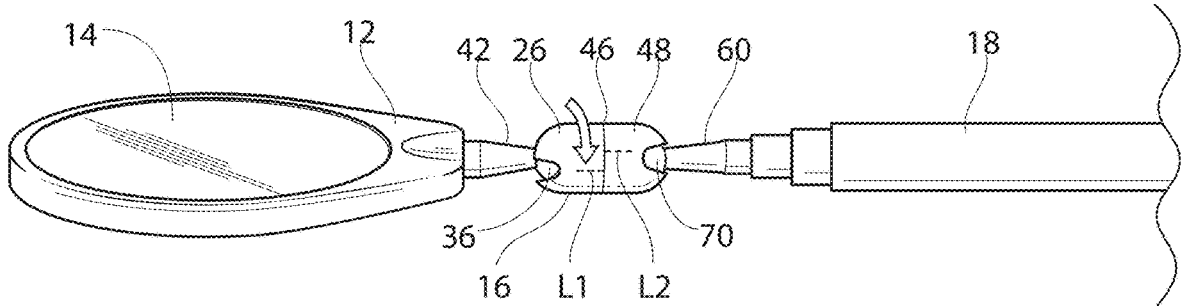
*Fig. 9B*
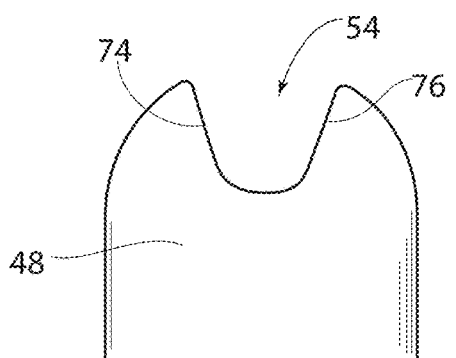
*Fig. 10*
*Fig. 11*
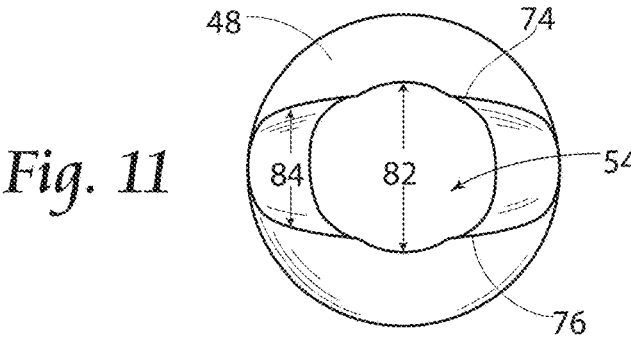

DOUBLE BALL AND SOCKET JOINT

CROSS-REFERENCE TO RELATED APPLICATIONS

This patent application is related to U.S. Design patents application Ser. Nos. 29/873,868 and 29/873,873, both filed Apr. 10, 2023.

BACKGROUND OF THE INVENTION

The present invention is a double ball and socket joint that has excellent utility with, among other things, automotive inspection mirrors.

Ball and socket joints are used in a wide variety of applications where smooth, multi-directional movement is required. The components of a ball and socket joint typically include a ball—a spherical component that fits into a socket and allows for multi-directional movement. The ball is positioned within the socket, which is a concave component that holds the ball and allows the ball to move in different directions. The ball is coupled to an object intended for multi-directional movement, so that the object intended for multi-directional movement can be manipulated to its desired position.

A double ball and socket joint is a type of joint that has two ball and socket components. This type of joint allows for a wider range of motion compared to a single ball and socket joint, as it allows for independent movement of two objects, one object connected to each ball.

Automotive inspection mirrors are used to help mechanics and inspectors get a better view of hard-to-reach areas on vehicles. These tools are designed to be generally long and thin, with a mirror at the end that can be positioned to reflect light and images. The mirror is often held by a telescopic shaft that carries a handle.

Automotive inspection mirrors are commonly used for checking underneath a car. The mirror can be used to check for leaks or damage to the undercarriage of a car without having to lift the car off the ground. The mirror can also be used to check the engine compartment for damage or leaks, or to get a better view of parts that are difficult to see otherwise. The mirror can also be used to inspect suspension components, exhaust systems, and other parts that are difficult to see without getting under the vehicle.

Double ball and socket joints in prior art automotive mirrors are commonly comprised of two parallel plates, each plate with two interior partially spherical depressions. The two plates are separated, and two balls are held between the parallel plates. Each ball is held between two corresponding partially spherical depressions, one depression on each plate. The plates are held together with a simple nut and bolt, compressing the plates against the balls to retain the balls.

SUMMARY OF THE INVENTION

A double ball and socket joint is disclosed. The double ball and socket joint is formed of a two-piece capsule. Each piece of the capsule carries within it a ball which carries an extension combination that operates rotationally within a socket. The extensions are connected to the capsule through void spaces at both distal ends of the capsule. The two pieces of the capsule are preferably in snap-fit engagement. The result is that the double ball and socket joint of the present invention provides infinite combinations of rotation about five axes of rotation: a first and a second axis of rotation about the first ball, a third and a fourth axis of rotation about the second ball, and a fifth axis of rotation is provided when the two pieces of the capsule are rotated relative to one another.

BRIEF DESCRIPTION OF DRAWINGS

FIG. 7 is a cross-sectional view of the capsule of the double ball and socket joint;

FIG. 8 is a rear perspective view of the mirror inspection tool showing dual articulation;

FIGS. 9A and 9B are side views of the mirror inspection tool showing independent rotation of a first capsule portion relative to a second capsule portion;

FIG. 10 is a side view of one capsule portion;

FIG. 11 is a top view of the capsule portion of FIG. 10.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

A stadium is a two-dimensional geometric shape constructed of a rectangle with semicircles at a pair of opposite sides of the rectangle. A capsule can be produced by revolving a stadium around a line of symmetry that bisects the semicircles. A capsule can also be produce asymmetrically, and a capsule may be pill shaped, but capsules may take on any number of other shapes or sizes, such as spheres, jellybean shapes, cones, or any other three-dimensional shape.

Figures 1, 2, 3:
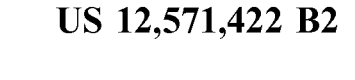
FIG. 1 is a perspective view of a mirror inspection tool showing a double ball and socket joint of the present invention coupled to a mirror bezel and mirror, and coupled to a telescoping shaft carrying a handle.
FIG. 2 is a top view of the mirror inspection tool showing rotation of the mirror bezel in a first plane by rotating either an extension carrying the mirror bezel with respect to a capsule of the double ball and socket joint, or rotating the capsule relative to the telescoping shaft and therefore a handle of the mirror inspection tool.
FIG. 3 is a side view of the mirror inspection tool showing rotation of the mirror bezel in a second plane by rotating either the extension carrying the mirror bezel with respect to the capsule, or rotating the capsule relative to the telescoping shaft and therefore to the handle of the mirror inspection tool.

Referring now to FIG. 1, a perspective view of a mirror inspection tool 10 showing a double ball and socket joint 16 is shown, the double ball and socket joint 16 coupled to a mirror bezel 12 carrying mirror 14 at one end, and coupled to a telescoping shaft 18 carrying a handle 20 at the other end.

The double ball and socket joint 16 is preferably comprised of two portions, a first capsule portion 26, and a second capsule portion 48. Between the first capsule portion 26 and the second capsule portion 48 is a seam 46. As will be described later, each capsule portion 26 and 48 carries within it a ball (best viewed in cross-section such as in FIG. 7). Extending from the first capsule portion 26 through first portion exit void 34 is a first ball extension 42 which is coupled to the mirror bezel 12. Extending from the second capsule portion 48 through second portion exit void 54 is a second ball extension 60 coupled to the telescoping rod 18.

Referring now to FIG. 2, a top view of the mirror inspection tool 10 is shown, and depicts rotation of the mirror bezel 12 in a first plane. Mirror bezel 12 can be rotated in this plane either by: i) rotating extension 42 carrying the mirror bezel 12 with respect to capsule 16 (for instance from its initial position shown in solid, then upwardly to the position shown in phantom on top of FIG. 2); or ii) rotating capsule 16 relative to second ball extension 60 and therefore both the telescoping shaft 18 and the handle 20 (for instance from its initial position shown in solid, downwardly to the position shown in phantom on bottom of FIG. 2).

Referring now to FIG. 3, a side view of the mirror inspection tool 10 is shown, and depicts rotation of the mirror bezel 12 in a second plane. Mirror bezel 12 can be rotated in this plane either by: i) rotating extension 42 carrying the mirror bezel 12 with respect to capsule 16 (for instance from its initial horizontal position shown in solid, upwardly and downwardly to the two positions shown in phantom closest to the initial position shown in solid); or ii) rotating capsule 16 relative to second ball extension 60 and therefore both the telescoping shaft 18 and the handle 20 (for instance from its initial position shown in solid, upwardly to the nearly vertical position shown in phantom on top of FIG. 3).

Figure 4:
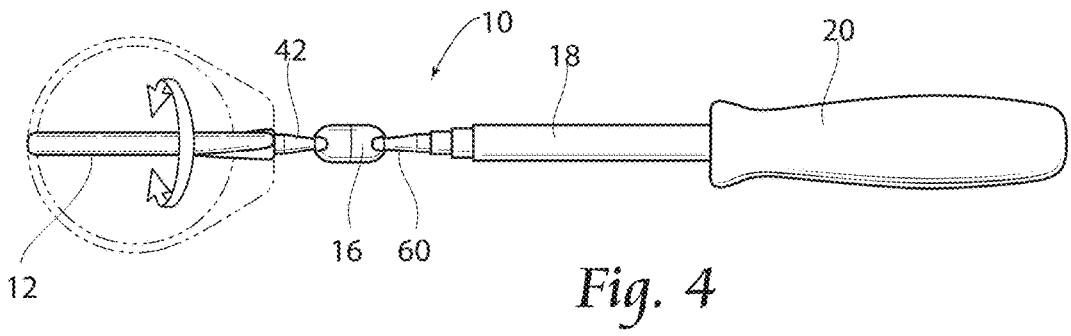
FIG. 4 is a side view of the mirror inspection tool showing rotation of the mirror bezel in a third plane by rotating the extension carrying the mirror bezel with respect to the capsule.

Referring now to FIG. 4, a side view is shown of the mirror inspection tool 10 showing rotation of the mirror bezel 12 in a third plane by rotating the first ball extension 42 with respect to the capsule 16. In this manner, mirror bezel 12 can effectively spin from its horizontal position shown in solid, to its vertical position shown in phantom.

Figure 5:
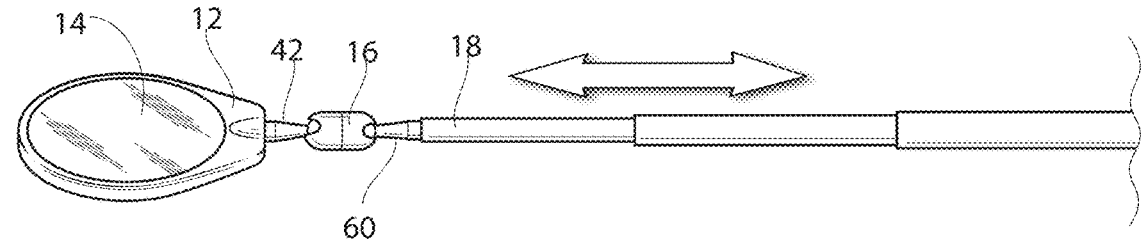
FIG. 5 is a side perspective view of the mirror inspection tool showing extension of a telescoping shaft.

Referring now to FIG. 5, a side perspective view is shown of the mirror inspection tool 10 depicting extension of telescoping shaft 18, as is known in the art.

Figure 6:
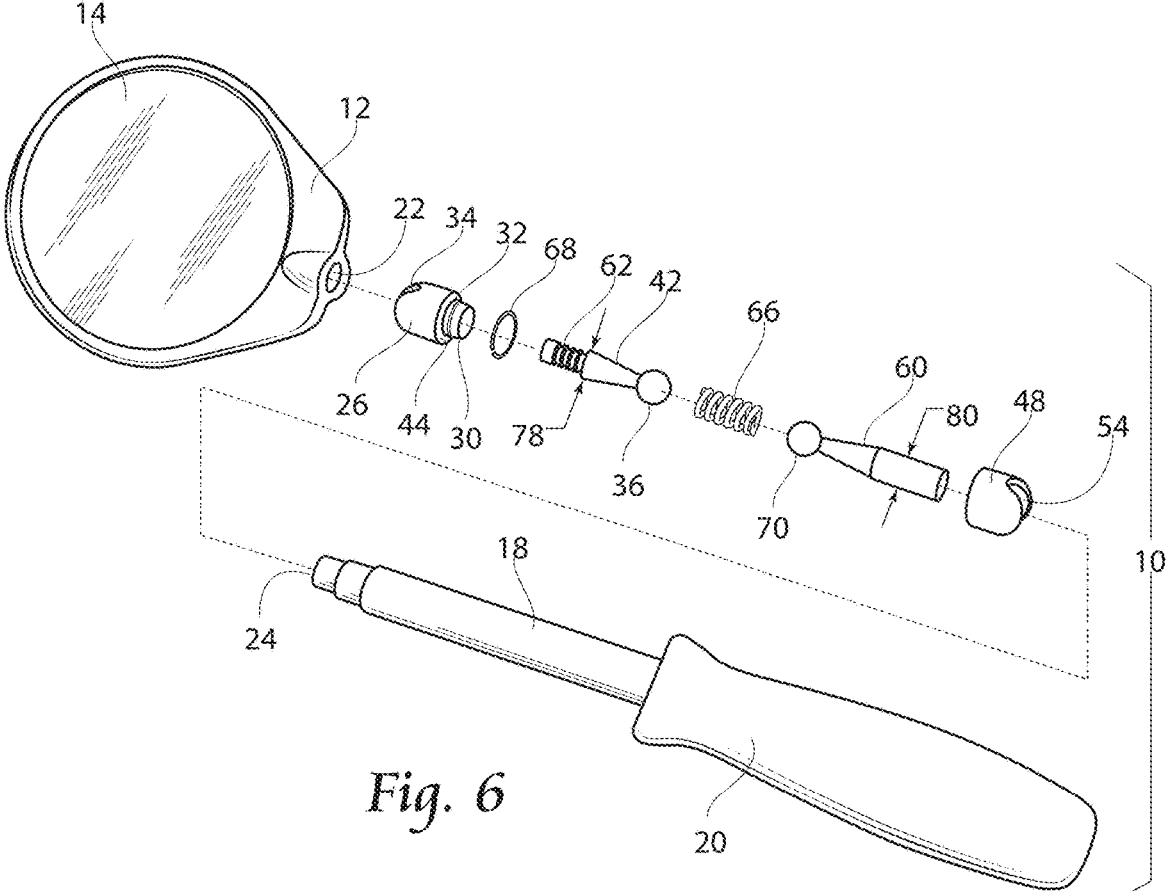
FIG. 6 is an exploded view of components of the mirror inspection tool.

Referring now to FIG. 6, an exploded view of components of the mirror inspection tool 10 is shown. To assemble the mirror inspection tool 10, first ball extension 42, with ball 36 at its interior end, is placed through Retaining ring 68, and next through a first portion hollow male protrusion 30. The first ball extension 42 extends through a first portion hollow interior section 28 (seen in FIG. 7) that extends through the capsule first portion 26. The first ball extension 42 exits the capsule first portion 26 at a first portion exit void 34. Preferably, a knurled portion 62 of first ball extension 42 is press-fit coupled to the mirror bezel 12 within a mirror ball extension receiver 22, formed in mirror bezel 12. However, any method can be used to couple first ball extension 42 to mirror bezel 12 (e.g., adhesively, crimped, welded, screwed, nailed, etc.) Continuing with construction of the telescoping mirror assembly 10, second ball extension 60, which carries second ball 70, is inserted through the capsule second portion, 48, and second ball extension 60 extends outwardly through a second portion exit avoid 54. Second ball extension 60 can then be coupled with telescoping rod 18 at a telescoping rod ball extension receiver 24, again using any means possible. Next, spring 66 is positioned between first ball 36 and second ball 70, and the capsule first portion 26 and capsule second portion 48 are coupled together, encapsulating the Retaining ring 68, the first ball 36, the spring 66, and the second ball 70.

Figures 7, 8, 9A:
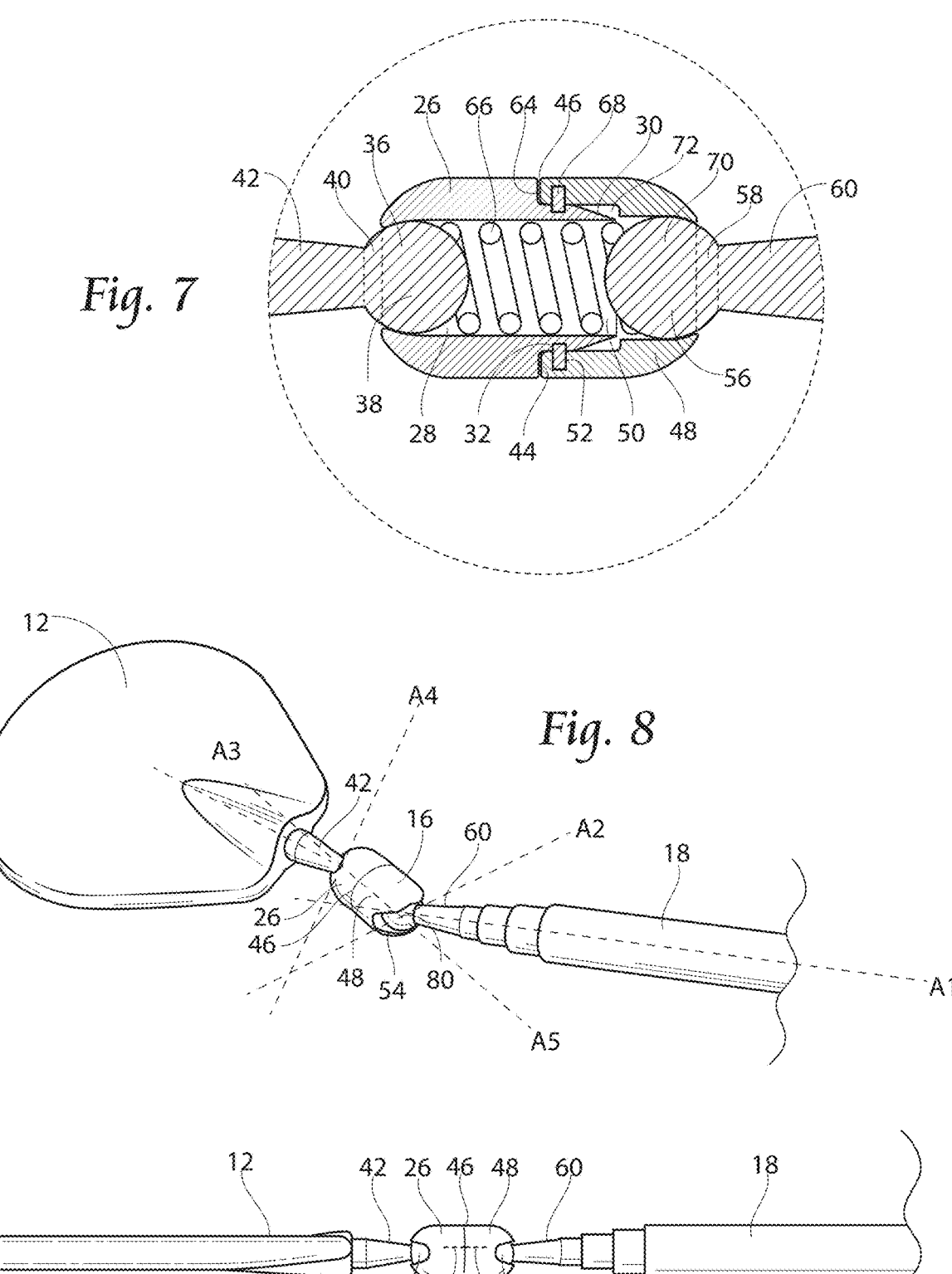

A cross-sectional view of the capsule 16 is shown in FIG. 7 following assembly. A major portion 38 of first ball 36 is carried within first portion hollow interior section 28. A minor portion 40 of first ball 36 carries first ball extension 42 away from the capsule first portion 26. Likewise, a major portion 56 of second ball 70 is carried within second portion hollow interior section 50, and a minor portion 58 of second ball 70 carries second ball extension 60 away from the capsule second portion 48.

In a preferred embodiment, first ball extension 42 and second ball extension 60 are tapered from a narrowest portion at balls 36 and 70 respectively, to a first extension maximum width 78 and a second extension maximum width 80 (shown in FIG. 6).

A second portion hollow interior cutout 72 is provided in the wall of capsule second portion 48. In a preferred embodiment, a second portion annular ring 52 is formed within and about an interior periphery of a wall of the capsule second portion 48. Similarly, in a preferred embodiment, a male protrusion annular ring 32 is formed in first portion hollow male protrusion 30 about an outer periphery of protrusion 30.

When first portion hollow male protrusion 30 is inserted into second portion hollow interior section 50, first portion hollow male protrusion 30 is received into second portion hollow interior section 50, towards second portion hollow interior cutout 72. At full insertion of first portion hollow male protrusion 30 into second portion hollow interior section 50, Retaining ring 68 is carried between the male protrusion annular ring 32 and second portion annular ring 52, creating a snap-fit. At snap-fit, first portion abutment edge 44 and second portion abutment edge 64 adjoin, between them creating seam 46 about which rotation of the capsule first portion 26 with respect to the capsule second portion 48 can take place.

Referring now to FIG. 8, a rear perspective view is shown of the mirror inspection tool 10, demonstrating showing dual articulation. As previously described, first ball extension 42 is free to rotate about its own axis A3 (spinning) and also rotate through first portion exit void 34 about axis A4. Similarly, second ball extension 60 is free to rotate about its own axis A1 (spinning) and also rotate through second portion exit void 54 about axis A2.

Referring now to FIGS. 9A and 9B, side views are shown of the mirror inspection tool 10 demonstrating independent rotation of capsule first portion 26 relative to a capsule second portion 48. In FIG. 9A, first reference line L1 is aligned with second reference line L2. Capsule first portion 26 can be independently rotated relative to capsule second portion 48 about seam 46, resulting in rotational displacement between L1 and L2 as seen in FIG. 9B. Along with two axes of rotation previously described for each ball 36 and 70, this rotation of first portion 26 relative to capsule second portion 48 provides a fifth axis of revolution A5 (see FIG. 8) from the double ball and socket joint itself.

Referring now to FIG. 10, a side view of second capsule portion 48 is shown. In a preferred embodiment, second portion exit void 54 comprises a groove through and across a distal end of capsule portion 48 as shown. Groove first wall 74 and groove second wall 76 carry between them second ball extension 60 when in use, as shown in FIG. 1. Capsule first portion 26 can be constructed similarly, and then provided with the first portion hollow male protrusion 30.

Referring now to FIG. 11, a top view of second capsule portion 48 is shown. Groove walls 74 and 76 are separated by a first distance 82 and a second, maximum distance 84. The distance between groove walls 74 and 76 can be variable. In a preferred embodiment, maximum distance 84 corresponds with a tight fit about second extension maximum width 80, and first distance 82 preferably corresponds with a tight fit about a smaller portion of the taper of second extension 60 proximal to second ball 70 (see, e.g., FIG. 6). Capsule first portion 26 can be constructed similarly.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A ball joint comprising:
a capsule;
a first portion of said capsule and a second portion of said capsule, said capsule portions coupled in snap-fit engagement and divided at a cross-section of said capsule;
said first portion of said capsule comprising a first hollow interior section and a male protrusion;
said second portion of said capsule comprising a second hollow interior section;
a first exit void at a distal portion of said first portion of said capsule;
a second exit void at a distal portion of said second portion of said capsule;
a first ball comprising a first ball major portion and a first ball minor portion, said first ball major portion positioned within said first hollow interior section of said first portion of said capsule, said first ball carrying a first extension;
a second ball comprising a second ball major portion and a second ball minor portion, said second ball major portion positioned within said second hollow interior section of said second portion of said capsule, said second ball carrying a second extension;
a spring positioned between said first ball major portion and said second ball major portion, said spring urging said first ball major portion and said second ball major portion towards said first and second exit voids, respectively;
said male protrusion of said first portion of said capsule extending into said second hollow interior section of said second portion of said capsule;

a first slot about an outer periphery of said male protrusion;
a second slot about an inner periphery of said second portion of said capsule;
a ring carried within said first slot and said second slot.

2. A ball joint according to claim 1, said ball joint further comprising a seam between said first and said second portions of said capsule at said cross-section of said capsule, said first portion of said capsule independently rotatable about said seam with respect to said second portion of said capsule.

3. A ball joint according to claim 1, said ball joint further comprising a first portion abutment portion positioned about a proximal end of said first portion.

4. A ball joint according to claim 1, said ball joint further comprising a second portion abutment portion positioned about a proximal end of said second portion.

5. A ball joint according to claim 1, said first and said second extensions carrying one of a rod and a mirror bezel.

6. A ball joint according to claim 1, at least a portion of at least one of said first and said second extensions comprising a knurled portion.

7. A ball joint according to claim 1, said first exit void comprising a groove across said distal portion of said first portion of said capsule.

8. A ball joint according to claim 7, said groove comprising a first groove wall and a second groove wall, said first and second groove walls spaced apart by a first distance greater than a maximum width of said first extension, and a second distance less than said maximum width of said first extension.

9. A ball joint according to claim 1, said second exit void comprising a groove across said distal portion of said second portion of said capsule.

10. A ball joint according to claim 9, said second groove comprising a first groove wall and a second groove wall, said first and second groove walls spaced apart by a first distance greater than a maximum width of said second extension, and a second distance less than said maximum width of said second extension.

11. A ball joint according to claim 1, said capsule comprising a stadium revolving about a line of symmetry.

12. A ball joint according to claim 11, wherein said first portion of said capsule and said second portion of said capsule are divided at said cross-section of said capsule substantially perpendicular to said line of symmetry.

13. A ball joint according to claim 1, said second hollow interior section comprising a cutout section from a wall of said second hollow interior section to receive said male protrusion of said first portion of said capsule.

* * * * *